No. 709,465. Patented Sept. 23, 1902.
J. BURRY.
MEANS FOR CONTROLLING THE CHARGING OF SECONDARY BATTERIES.
(Application filed Jan. 10, 1900.)
(No Model.) 2 Sheets—Sheet 1.

WITNESSES:
C. E. Ashley
Frank Ryall

INVENTOR:
John Burry,
By his Attorney
R. M. Barkley.

No. 709,465. Patented Sept. 23, 1902.
J. BURRY.
MEANS FOR CONTROLLING THE CHARGING OF SECONDARY BATTERIES.
(Application filed Jan. 10, 1900.)
(No Model.) 2 Sheets—Sheet 2.

WITNESSES:
C. E. Ashley
Frank Ryall.

INVENTOR:
John Burry,
By his Attorney
R. W. Barker.

UNITED STATES PATENT OFFICE.

JOHN BURRY, OF FORT LEE, NEW JERSEY.

MEANS FOR CONTROLLING THE CHARGING OF SECONDARY BATTERIES.

SPECIFICATION forming part of Letters Patent No. 709,465, dated September 23, 1902.

Application filed January 10, 1900. Serial No. 914. (No model.)

*To all whom it may concern:*

Be it known that I, JOHN BURRY, a citizen of the United States, and a resident of Fort Lee, in the county of Bergen and State of New Jersey, have invented a certain new and useful Improvement in Means for Controlling the Charging of Secondary or Storage Batteries, of which the following is a specification.

The present invention relates to apparatus for controlling the charging or energizing of storage batteries, one object of the invention being to prolong the life of such batteries.

Another object is to reduce the thickness of the coating formed or placed on the plates.

Another object is to avoid the scaling off of the coatings and the consequent injury to or destruction of the battery or cell.

Another object is to energize such batteries by a succession of charges each of short duration.

Another object is to utilize electric-lighting or power current of high-heating power for charging storage batteries which are placed and used in buildings in which it is not permitted by the rules of insurance companies to have current of power sufficient to cause fires, and other objects will appear hereinafter.

To these ends the invention consists of features of construction and combinations of devices hereinafter described, and more particularly pointed out in the claims concluding this specification.

Several forms of the invention are illustrated in the accompanying drawings, forming part of this specification, in which—

Figure 1:
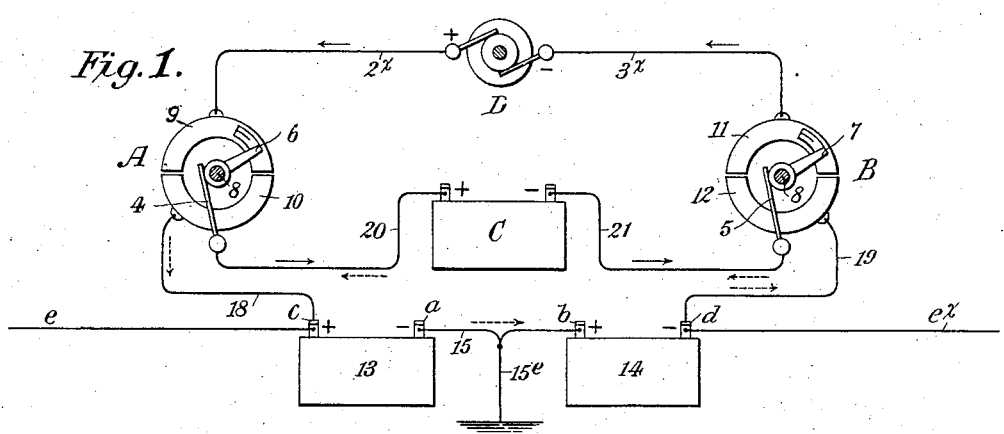
Figure 2:
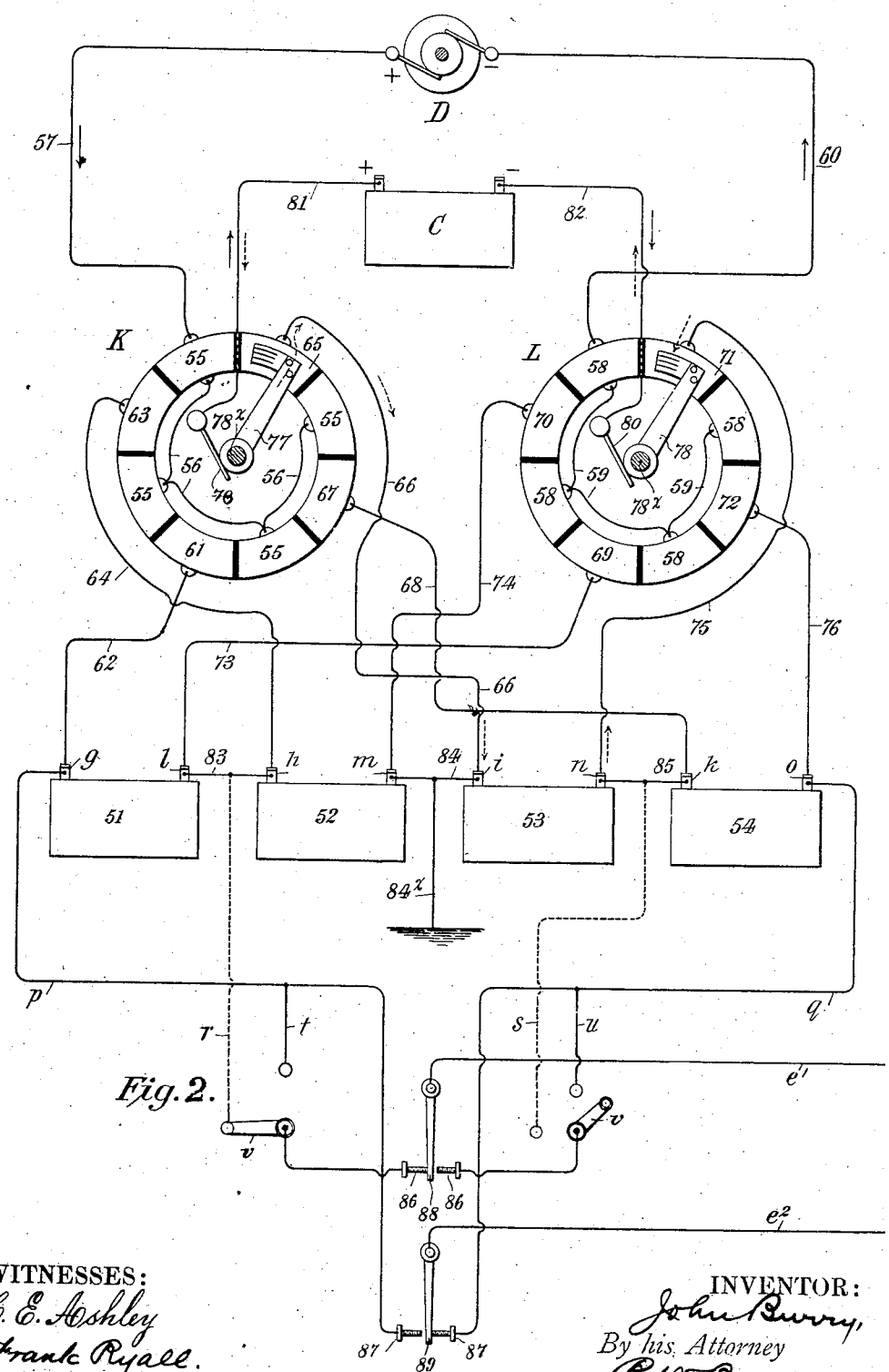

Figure 1 is a diagrammatic view showing a source of electric energy, a conveying or equalizing storage battery, two working storage batteries, means for putting said conveying-battery in circuit with said source and said working batteries alternately, and a line fed from said working batteries. Fig. 2 is a diagrammatic view showing a dynamo or other source of electric energy, a conveying or equalizing storage battery, a series of working storage batteries, means for connecting said equalizer at intervals or intermittently with said working batteries, one at a time, and with said source of electric energy during the intervals in which said equalizer is not connected with any working battery, and lines or circuits supplied with current from said working batteries.

In that form of the invention illustrated in Fig. 1 the reference D indicates a suitable source of electric energy, as a dynamo; B B, sunflowers; $2^\times$, a wire connecting one pole of source D with segment 9 of sunflower A; $3^\times$, a wire connecting the other pole of source D with segment 11 of sunflower B; 13 14, two secondary batteries; 18, a wire connecting pole $c$ of battery 13 with segment 10 of sunflower A; 19, a wire connecting pole $d$ of battery 14 with segment 12 of sunflower B; 15, a wire connecting pole $a$ of battery 13 with pole $b$ of battery 14; $15^c$, an earth connection or ground from conductor 15; 6, a trailer coacting with segments 9 10; 7, a trailer coacting with segments 11 12; 8, a rotary shaft on which the trailers 6 7 are fast and from which they are insulated, said trailers also being insulated from each other; 4, a brush bearing on the hub of trailer 6, and 5 a brush bearing on the hub of trailer 7. C is a secondary battery having one pole connected with brush 4 by a wire 20 and its other pole connected with the brush 5 by a wire 21.

The operation of the devices shown in Fig. 1 is as follows: The shaft 8 is driven at any desired speed, preferably several turns per second, thus moving the trailers from one to another of the contact points or segments of the corresponding sunflowers. When the trailers 6 7 are on the segments 9 and 11, the source of energy D is electrically connected with said conveying-battery C through the conductor $2^\times$, segment 9, trailer 6, brush 4, wires 20 21, brush 5, trailer 7, segment 11, and wire $3^\times$ and the batteries are wholly cut off from said source D; but when the trailers 6 7 are on the segments 10 and 12 the battery C and batteries 13 14 are wholly cut off from the source D, but are in circuit with each other through the conductor 20, brush 4, segment 10, wires 18 and 15 and 19, segment 12, trailer 7, brush 5, and wire 21. By this mode of operation the battery C receives charges intermittently from the source D and intermittently charges the batteries 13 14, the two operations alternating with each other. The current received by the battery C from the line $2^\times$ $3^\times$ may be of any suitable voltage and amperage and is translated or conveyed by the battery C to the batteries 13 14, and there is no danger of grounding the main circuit $2^\times$ $3^\times$ through or by means of the circuits through said batteries 13 14. By having twice as many cells in battery C as there are in either of batteries 13 14 and by grounding wire 15 the voltage in each of the lines $e^x$ is one-half that of current from battery C. The joining of the batteries 13 14 by the grounded wire 15 makes a "split battery" of them.

By the construction and arrangement illustrated in Fig. 1 the current in main line $2^\times$ $3^\times$ is never in connection with either of lines $e^x$, so that variations in the main-line current cannot be caused by grounding either of these lines $e^x$, and vice versa—that is to say, the battery C constitutes a source of energy of substantially constant power for the battery 13 14 and acts as a conveyer or translator of current between the main-line current and the battery 13 14.

In that form of the invention illustrated in Fig. 2 there is a conveying storage battery or equivalent equalizer placed intermediate the primary source of electric energy and the working circuits and their immediate source or sources of electric energy. Referring to Fig. 2, D marks a source of electric energy, as a dynamo or the secondary of a transformer. C marks a conveying or equalizing storage battery, 51 52 53 54 separate working storage batteries, and $e'$ $e^2$ working circuits deriving current from the batteries 51 52 53 54. K L are independent sunflowers, each having eight segments insulated from each other, except that alternate segments 55 of sunflower K are connected together by wires 56 and with one pole of source D by wire 57 and alternate segments 58 of sunflower L are connected with each other by wires 59 and with the other pole of source D by a wire 60. The remaining segments of sunflower K are electrically connected—one segment, 61, with the pole $g$ of the storage battery 51 by a wire 62, another segment, 63, with the pole $h$ of the storage battery 52 by a wire 64, a third segment, 65, with pole $i$ of the storage battery 53 by a wire 66, and the fourth segment, 67, of the sunflower K with a pole $k$ of battery 54 by a wire 68. The said poles $g$ $h$ $i$ $k$ are all of the same sign, as positive. In like manner the remaining segments 69 70 71 72 of sunflower L are connected with the other poles $l$ $m$ $n$ $o$ of the batteries 51 52 53 54 by wires 73 74 75 76. The poles $l$ $m$ $n$ $o$ are also of like nature or sign and are of a sign different from that of the poles $g$ $h$ $i$ $k$. A rotatory trailer 77 coacts with the segments of sunflower K, and a similar trailer 78 coacts with the segments of sunflower L, said trailers being insulated from each other and from the shaft $78^\times$, to which they are fast and with which they rotate. A brush 79 bears upon the hub of the trailer 77 and a brush 80 bears upon the hub of the trailer 78. The battery C is connected with the brushes 79 80 by wires 81 82. The unlike poles of batteries 51 52, of batteries 52 53, and of batteries 53 54 are respectively joined by wires or other conductors 83 84 85, and conductor 84 is grounded at $84^\times$, so that the entire series of batteries 51 52 53 54 forms a split battery. Current may be taken from the split battery in any suitable or desired manner, as from the ends thereof, by wires $p$ $q$, or from points intermediate the ends, as by wires $r$ $s$, which are connected with wires 83 and 85, respectively. References 86 87 indicate contact-points between which relay armature-levers 88 89 vibrate and reverse the polarity of the lines $e'$ $e^2$, in which suitable telegraph instruments (not shown) are placed. Such relays and instruments are shown in several prior patents of mine and need not be here further referred to. Provision is made for meeting varying or different electrical conditions in the lines, as by branch wires $t$ $u$ and switches $v$, by means of which the circuit $e'$, for example, may be supplied with current from the ends of the split battery or from points intermediate the ends thereof, as through the wires $r$ $s$. The voltage is lower, of course, when current is taken from the intermediate points.

The operation of the devices illustrated in Fig. 2 is as follows: The shaft $78^\times$ is driven at a suitable speed, preferably several turns thereof per second, thus carrying the trailers 77 78 around from one to another of their respective sunflowers K L. Each time trailer 77 is on one of the segments 55 the trailer 78 is on one of the segments 58 and the source of energy D is in circuit with the battery C to energize the same, and at the same time the batteries 51 52 53 54 are wholly disconnected from the battery C. When trailer 77 is on segment 65, the trailer 78 is on segment 71 and the battery 53 is in circuit with and receives a charge from the battery C and the source D is wholly cut off from battery C. Similarly, when trailers 77 78 are on segments 67 and 72, respectively, battery C is in circuit with battery 54 and sends a charge thereto. When trailers 77 78 are on segments 61 and 69, respectively, battery C is in circuit and gives a charge to the battery 51, and when trailers 77 78 are on the segments 63 and 70, respectively, battery C is in circuit with and charges battery 52, and source D is wholly cut off from battery C every time the latter is in circuit with any one of the batteries 51 52 53 54. The operation, therefore, is that battery C is thrown into circuit with batteries 51 52 53 54 in turn, and that it is electrically connected with the source D in the intervals between its disconnection from one and its connection with another of the batteries 51 52 53 54, and that it is not simultaneously in circuit with source D and any of said batteries 51 52 53 54. Assuming that the current delivered by source D is at one hundred and fifteen volts, that battery C contains sixty (60) cells, and that each of the batteries 51 52 53 54 contains sixty (60) cells, the voltage of the current delivered by battery C will be about one hundred and ten, and the voltage in the lines $e'$ $e^2$ will be about two hundred and ten when current is taken from the ends of the split battery 51 54 by wires $p$ $q$ and about one hundred and five or one hundred and ten when current is taken from the wires 83 and 85 by the wires $r$ $s$.

By the use of an equalizer or conveyer intermediate the primary source of electric energy and the working battery or batteries (those supplying current to the working circuits, as the line $e$, or $e^x$, or $e^z$, or $e'$ $e^2$) provision is made for preventing grounding of the charging-current by way of working circuits, thus securing that the said primary source may be the ordinary electric lighting or power circuits wherein there may too great amperage and voltage to permit of their direct introduction into buildings, because of the rules of insurance companies, and by connecting the equalizer with the working batteries and with the said primary source of electric energy in alternation the further advantage of reduced weights is secured. By connecting a series of working batteries one by one with a source of electric energy for short intervals of time some of the advantages above named may be had in greater or less measure, and by the use of the conveyer or equalizer intermediate the primary and working circuits or said series of batteries and alternately connecting said conveyer with said primary source and said batteries, but not with more than a part of said batteries at any one time, all of the advantages above named may be secured.

What I claim as new, and desire to secure by Letters Patent of the United States, is—

1. In a system for supplying electric energy from a central station, the combination with a main line or feeder circuit, of a storage battery for supplying energy to a local or consumption circuit, said circuits being always isolated from each other, an energy-conveyer, and means for connecting said conveyer with and disconnecting it from said main and consumption circuits in alternation, whereby the said conveyer while disconnected from the feeder-circuit charges the storage battery and while disconnected from the consumption-circuit receives energy from the feeder-circuit.

2. In a system for supplying electric energy from a central station, the combination with a main line or feeder circuit, of a plurality of storage batteries for supplying energy to a local or consumption circuit, said circuits being always isolated from each other, an energy-conveyer, and means for connecting said conveyer with said storage batteries one at a time in succession, said means disconnecting said conveyer from each storage battery before connecting it with the next in order and connecting the conveyer with and disconnecting it from the feeder-circuit in the intervals between the disconnection of the conveyer from one storage battery and its connection with the next in order, whereby said conveyer is charged while disconnected from the storage batteries and discharges while disconnected from the feeder-circuit.

Signed at New York city, in the county of New York and State of New York, this 8th day of January, A. D. 1900.

JOHN BURRY.

Witnesses:
E. D. O'BRIEN,
R. W. BARKLEY.